Dec. 29, 1931.  O. K. KELLEY  1,838,946

TRANSMISSION

Filed May 4, 1929  2 Sheets-Sheet 1

Inventor
Oliver K. Kelley
By Blackmore, Spencer & Flint
Attorneys

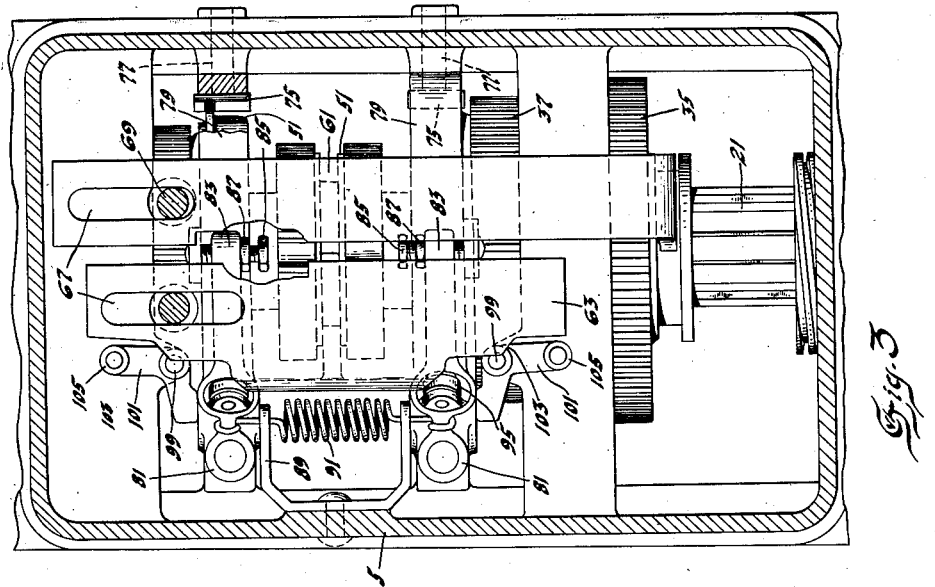

Patented Dec. 29, 1931

1,838,946

UNITED STATES PATENT OFFICE

OLIVER K. KELLEY, OF DETROIT, MICHIGAN, ASSIGNOR TO GENERAL MOTORS CORPORATION, OF DETROIT, MICHIGAN, A CORPORATION OF DELAWARE

TRANSMISSION

Application filed May 4, 1929. Serial No. 360,538.

This invention relates to transmission mechanism and particularly to a synchronizing device for facilitating gear shifting. More specifically, the invention is concerned with that type of a synchronizing transmission in which, prior to the engagement of positive clutches, friction clutches are first engaged to effect synchronization and then released to facilitate the engagement of the positive clutches.

An object of the invention is to improve the operation of the sequential clutch arrangement.

Another object is to provide automatically operating means to positively release the friction clutch prior to the engagement of the positive clutch.

Other objects and advantages will be understood from the following description and from the accompanying drawings.

In the drawings:

Figure 2 is a transverse vertical section on line 2—2 of Figure 1.

Figure 3 is a horizontal section on line 3—3 of Figure 2, showing the operating mechanism and plan view.

Figure 1:
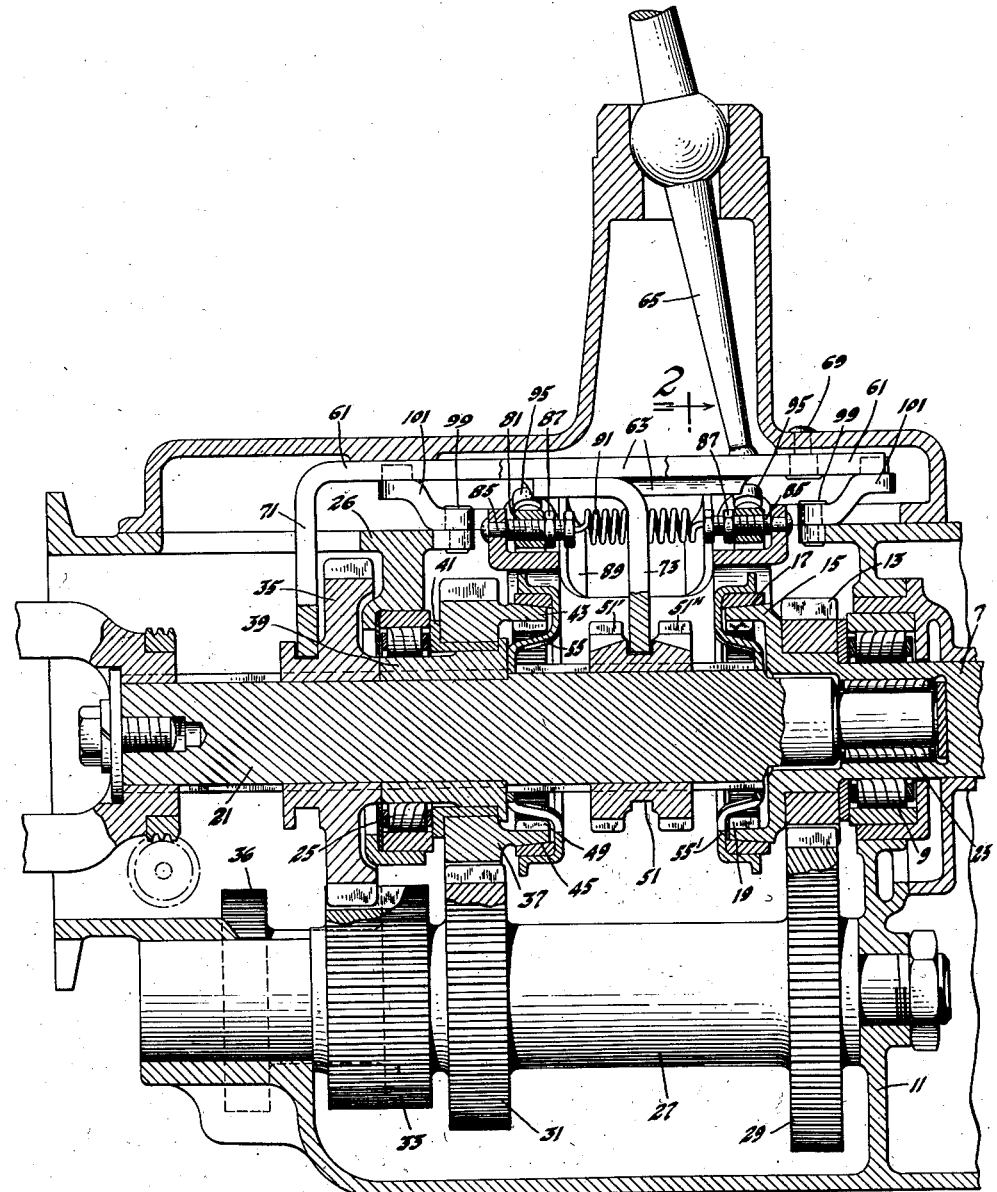
Figure 1 is a longitudinal section through a transmission for use on motor vehicles.

Referring by reference characters to the drawings, numeral 5 shows a transmission housing or casing. A driving shaft 7 is rotatably supported by an anti-friction bearing 9 in the casing wall 11. Inwardly of the casing wall from the bearing 9 the shaft 7 is provided with a driving gear 13. At its extreme end, shaft 7 is enlarged and terminates in a ring 15 having an external friction face 17 and internal clutch teeth 19. Driven shaft 21 is arranged in alinement with driving shaft 7. It is reduced at its forward end and piloted within bearings 23 positioned within the recessed end of shaft 7. For the further support of driven shaft 21, I make use of a bearing located forward of the rear end of the casing. This bearing 25 is in a portion 26 between the driven second speed gear and low speed gear. By means of this bearing location, the overhang of the driven gears for second and low speed is materially reduced and there is, therefore, less tendency for the shaft 21 to deflect. This results in better gear engagement and less noise.

At 27 is shown a countershaft with a gear 29 in constant mesh with gear 13. The countershaft has also a second speed driving gear 31 and a somewhat elongated low speed driving gear 33. On the driven spline shaft 21 is a sliding gear 35 axially movable in a forward direction to engage the rear portion of gear 33 for low speed driving. It is also movable rearwardly to engage the rear portion 36 of the reverse idler, the front portion of which is in constant mesh with the front portion of gear 33. When 35 is in engagement with 36, the transmission will be in reverse.

The second speed driven gear 37 is in constant mesh with gear 31 on the countershaft and is rotatably mounted about the driven or spline shaft 21. The inner race 39 for bearing 25 may be extended forwardly and the gear 37 may be rotatably mounted about this extension as clearly illustrated, there being an intermediate ring and bearing retainer 41 as shown. Gear 37 is formed with a clutch ring 43. This ring has an external conical friction surface 45 and is also provided with internal clutch teeth 49.

A double clutch tooth element 51 having clutch teeth 51' and 51" is slidable and non-rotatable on the spline shaft 21 between the end of driving shaft 17 and the driven second speed gear 37. When moved forwardly, clutch teeth 51" engage clutch teeth 19 in which position the driving shaft drives the driven shaft without gear reduction. When moved rearwardly, teeth 51' engage teeth 49. Under these circumstances, the second speed driven gear 37 is locked to the driven shaft 21 and the transmission is operating at intermediate speed in the well known manner.

Spider rings 55 and 55' are arranged adjacent the second speed gear and ring 15 respectively. They are provided with friction faces as shown to engage the faces 45 and 17 as clearly illustrated in the drawings. The purpose of these friction clutches is to effect synchronization between the driving and driven members prior to the engagement of the positive clutches in a manner well understood in the art. These friction clutches are to be engaged and effect synchronization and thereafter must be disengaged prior to the engagement of the positive clutches, the disengagement facilitating the meshing of the clutch teeth of the positive clutches. The engagement is to be made automatically through the instrumentality of the shifting mechanism which actuates the positive clutch arrangement.

The operating mechanism for shifting may include a pair of shift rails 61 and 63, to be engaged individually by the shift lever 65 as usual. Slots 67 and pins 69 may be used to guide the rails in their reciprocating movement. Shift rails 61 has a depending fork 71 for shifting gear 35 to make shifts from neutral into reverse or low speed. Shift rail 63 carries a fork 73 to move the double tooth clutch member 51 for shifting into direct and second speed. Each friction clutch spider is engaged for movement by members 75 carried adjacent the pivots 77 of a yoke 79. It is understood that there will be one of these yokes 79 associated with each friction spider 55 and 55'. On one of the pivots 77 of each yoke is an arm 81, said arm having an extension 83 terminating adjacent the middle of the arc of the yoke. A bolt 85 is rotatable in the yoke adjacent the end of the arm and is mounted to have no axial movement. The end of the arm 81 is apertured and threaded on this bolt. By turning the bolt, the relative position of the arm and yoke may be changed and the parts secured in any position of adjustment by convenient means such as a lock nut 87. A stop 89 is secured to the casing and a spring 91 is terminally secured to the two arms 81. This construction causes the two arms to normally engage the opposite ends of the stop 89. When the arms are thus in engagement with the stop, the yokes are holding the frictional spider elements 55 and 55' from contact with the co-operating friction clutch elements on the driving shaft and the second speed driven gear. Each arm 81 is apertured as at 93 to receive a spring pressed plunger equipped with a roller 95. Shift rail 63 is downturned on its edge for a part of its length and the shoulders between the ends and the downturned portions normally engage the rollers 95. This is very well shown in Figure 3. When shift rail 63 is moved longitudinally a shoulder as described above engaging a roller moves the arm 81 and consequently the yoke 79. The yoke swings on its pivot and through the instrumentality of part 75 effects the engagement of one pair of the friction clutch elements.

After synchronization through the friction clutch and just before the engagement of the positive clutch, the spring 91 releases the parts of the friction clutch, drawing the arm 81 against the stop 89. As a means to supplement the action of spring 91 and to positively insure the release of the friction clutch, there may be pivoted to the casing as at 99 levers 101, one at each end of rail 63 as clearly illustrated in Figure 3. The rail is cam shaped at its ends to form shoulders 103 and when the shoulder 103 engages a roller 105 on the end of a roller, the lever 101 is rotated on its pivot 99. The other arm of the lever being in engagement with the arm 81 positively pushes the arm 81 to its release position and, therefore, positively effects the release of the corresponding friction clutch. Thus positive release is desirable to insure the easy engagement of the positive tooth clutch elements.

It will be understood that the action of this mechanism involving the co-acting friction clutch elements, release of said friction clutch elements and the subsequent co-action of the positive clutch elements is the same both in the case of the engagement of the second speed driving gear with the driven shaft and in the engagement of the transmission shaft with the driving shaft for driving in high. The invention is more particularly directed to the use of the positive clutch release mechanism involving the levers 101 to supplement the yielding spring 91.

I claim:

1. In a synchronizing transmission, a driving member, a driven member, means to frictionally connect said members, means to positively clutch said members, common means to manually operate said frictional connecting means and said positive clutch means in sequence, yielding means to release said frictional connecting means, a positive means to supplement said yielding means and positively effect the release of said frictional connecting means prior to the engagement of said positive clutch means.

2. The invention defined by claim 1, said last mentioned positive release means being operated by said common means.

3. In a synchronizing transmission, a driving member, a driven member, frictional clutch means to connect said members, positive clutch means to connect said members, common means to operate both said frictional clutch means and said positive clutch means in sequence, a lever to positively release said frictional clutch means prior to the engagement of said positive clutch means, said common means operable upon said lever to effect said disengagement.

4. In a synchronizing transmission, a driving member, a coaxial driven member, said driving member having a friction clutch element and a tooth clutch element, a member slidable on said driven member, said slidable member having a tooth clutch element for engagement with the tooth clutch element of the driving member, a second frictional clutch element slidable and non-rotatable on the driven member and positioned adjacent the first mentioned friction clutch element, common means to move said slidable member with its tooth clutch element, and said second slidable friction clutch element whereby said friction clutch element and said tooth clutch elements are sequentially engaged, together with resilient means and independent positively operating means to restore to clutch release position the friction clutch elements prior to the engagement of the tooth clutch elements.

5. The invention defined by claim 4, said positive operating means comprising a lever, said lever having a plurality of arms, one arm engaging a part of the slidable friction clutch element, said common means having a cam surface engageable with a second arm of said lever.

6. In a synchronizing transmission, a driving member, a driven member, means to frictionally connect said members, means to positively connect said members, common means movable to operate both said frictional means and said positive means in sequence, mechanism structurally independent of said common means, said mechanism being inactive during a first movement of said common means from a neutral position but engaged and moved by said common means after a limited movement thereof to release said friction means prior to the engagement of said positive connecting means.

In testimony whereof I affix my signature.
OLIVER K. KELLEY.